United States Patent
George

(10) Patent No.: US 8,023,173 B2
(45) Date of Patent: Sep. 20, 2011

(54) BIAXIAL MIRROR COLOR SELECTING MICRO IMAGER

(75) Inventor: John Barrett George, Carmel, IN (US)

(73) Assignee: Thomson Licensing, Boulogne-Billancourt (FR)

(*) Notice: Subject to any disclaimer, the term of this patent is extended or adjusted under 35 U.S.C. 154(b) by 0 days.

(21) Appl. No.: 12/450,668

(22) PCT Filed: Apr. 12, 2007

(86) PCT No.: PCT/US2007/009141
§ 371 (c)(1),
(2), (4) Date: Oct. 5, 2009

(87) PCT Pub. No.: WO2008/127239
PCT Pub. Date: Oct. 23, 2008

(65) Prior Publication Data
US 2010/0110529 A1    May 6, 2010

(51) Int. Cl.
*G02B 26/00* (2006.01)
*G02B 26/08* (2006.01)
(52) U.S. Cl. .................... 359/290; 359/224.1
(58) Field of Classification Search ............. 359/198.1, 359/212.2, 224.1, 225.1, 226.1, 226.2, 290, 359/298
See application file for complete search history.

(56) References Cited

U.S. PATENT DOCUMENTS

| 2005/0062944 A1 | 3/2005 | Slobodin |
| 2005/0280883 A1 | 12/2005 | Seo et al. |
| 2006/0029295 A1 | 2/2006 | Wine et al. |

FOREIGN PATENT DOCUMENTS

| KR | 2002-0036302 A | * 5/2002 |
| KR | 20020036302 | 5/2002 |
| WO | WO 9503562 | 2/1995 |

OTHER PUBLICATIONS

International Search Report, dated Dec. 3, 2007.

* cited by examiner

*Primary Examiner* — William C Choi
(74) *Attorney, Agent, or Firm* — Robert D. Shedd; Patricia Verlangieri

(57) ABSTRACT

A controllable reflecting device having an array of bi-axial mirrors that are capable of pivoting in at least four directions is described. At least three primary colored light beams are directed at each of the bi-axial mirror in three of the four pivoting directions, one for each of the primary colored light beams and a single colored beam is reflected and directed toward a projection lens. In the fourth pivoting direction, no color beam is directed to the projection lens and black is projected.

8 Claims, 6 Drawing Sheets

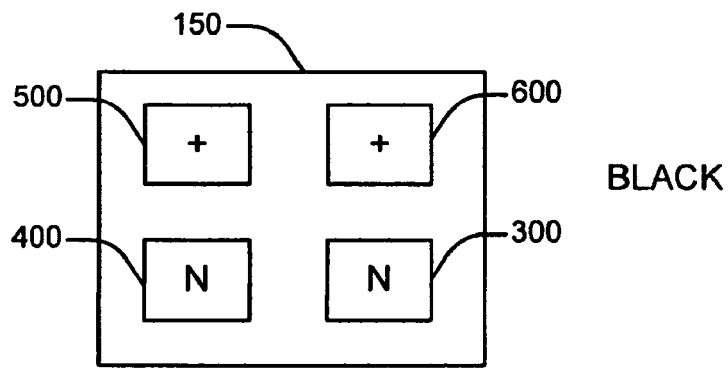
BLACK  Fig. 5A
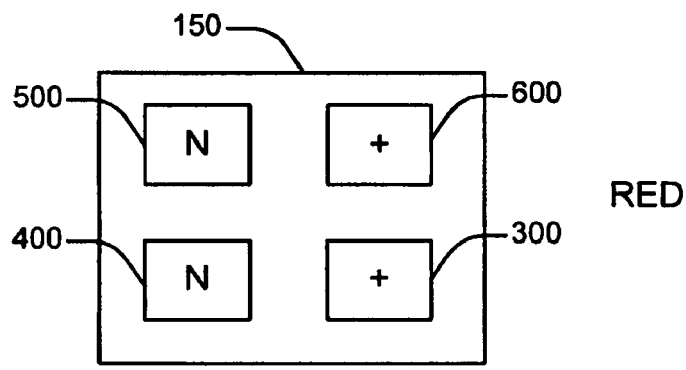
RED  Fig. 5B
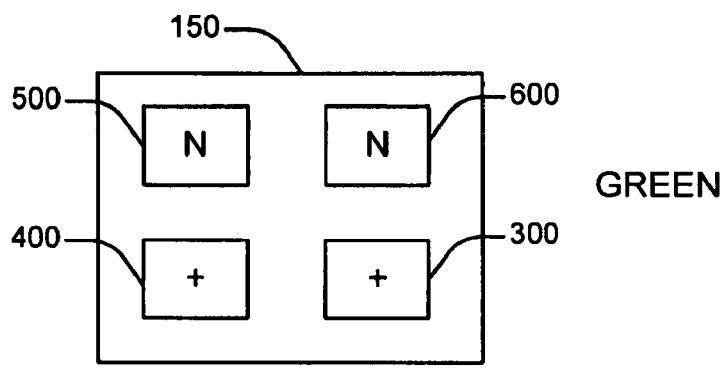
GREEN  Fig. 5C

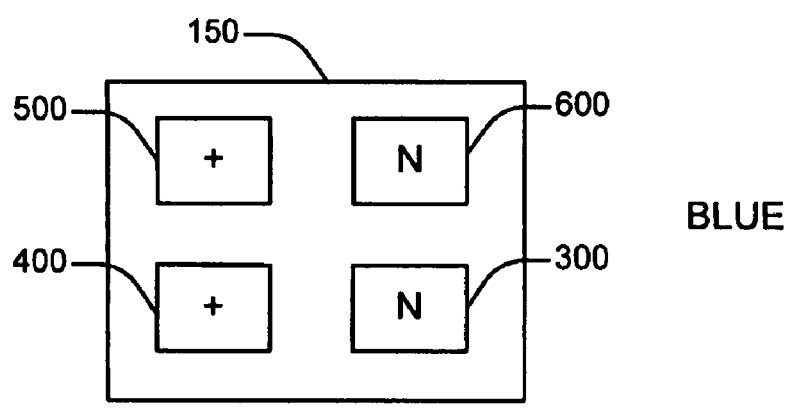
BLUE    Fig. 5D

BIAXIAL MIRROR COLOR SELECTING MICRO IMAGER

This application claims the benefit, under 35 U.S.C. §365 of International Application PCT/US2007/009141, filed Apr. 12, 2007 which was published in accordance with PCT Article 21(2) on Oct. 23, 2008 in English.

FIELD OF THE INVENTION

The invention is related generally to a projection system, and more particularly to a color filter for a projection system including micro-displays.

BACKGROUND

Micro-display projection systems using a reflective light engine or imager, such as, for example, a digital light processor (DLP™) (Texas Instruments) imager, are increasingly utilized in color image or video projection devices (e.g., rear projection television (RPTV), home theater front projection TV and theater systems). In an existing projection system, shown in FIG. 1, a light source 10 is provided, in this case a UHP lamp, and generates white light (i.e., all color spectrums). Light from the light source 10 passes through a color wheel 20 which has a plurality of dichroic filtering elements, each of which allows a light band of one of the colors: blue, green or red to pass through and reflects light of the other colors. The color wheel 20 is rotated so that a temporal pattern of blue, green, and red light bands pass through the color wheel. The color wheel is typically rotated fast enough to create at least one primary color period for each primary color during each frame of a video image.

An integrator 30 receives the light band from the light source 10 that is allowed to pass through the color wheel 20 and directs the light band through relay optics 40 into a total internal reflection (TIR) prism 50. The TIR prism 50 deflects the light band onto an imager 60, such as a DLP imager. The imager modulates the intensity of individual pixels of the light beam and reflects them back through the TIR prism 50 and into a projection lens system 70. In DLP only the flash rate and flash width is modulated giving the impression of intensity modulation. In LCD and LCOS the intensity is modulated directly. The projection lens system 70 focuses the light pixels onto a screen (not shown) to form a viewable image. A color video image is formed by rapid successive matrices of pixels of each of the three colors (blue, green, and red) which are blended by the viewer's eye to forth a full color image.

Throughout this specification, and consistent with the practice of the relevant art, the term pixel is used to designate a small area or dot of an image, the corresponding portion of a light transmission, and the portion of an imager producing that light transmission.

The DLP imager 60 comprises a matrix of micro-mirrors, moveable between an angle that reflects light through the TIR prism 50 and into the projection lens system 70 at an angle that deflects the light so that it is not projected by the projection lens system 70. Each micro-mirror reflects a pixel of light of a desired intensity depending upon a succession of flashes of that particular micro-mirror which in turn are responsive to a video signal addressed to the DLP imager 60. Thus, in the DLP imager 60, each micro-mirror or pixel of the imager modulates the light incident on it according to a gray-scale factor input to the imager or light engine to form a matrix of discrete modulated light signals or pixels.

Until recently, one micro-mirror has been used for each pixel of the projected image and the grid of the array of square mirrors has been aligned parallel to the image edges. However, using Smooth Picture™ (Texas Instruments) technology, the grid of the micro-mirror array is rotated 45 degrees with respect to the image edges and the pixels appear as diamond shapes. The image formed by such an array is then displaced by a moveable optical component (mirror or lens) so as to appear in two sequential positions displaced by one half of the square pixel diagonal. Half of the picture detail is displayed in each of the sequential images. This allows resolution to be double the micro-mirror count. Micro-mirror count can be reduced allowing a lower cost imager for low end projectors while maintaining resolution. For high-end products (digital cinema or high end television products) the mirror count can remain high and the resolution can be doubled.

The use of the color wheel introduces a visual artifact called the "Rainbow Effect". Since the color flashes sequentially, the color of the still object on the display will separate on the retina of a person's eye during rapid eye movement (eye dart) which can be up to a rate of 800 degrees per second. The brain perceives this separation as multiple primary colored images of the object with differing luminance. The luminance bandwidth of the visual system is wide but it also has a low pass characteristic. As the speed of color flashing is increased, the angular separation of the retina images decreases and the sensitivity to luminance variation decreases. Above about 3000 color flashes per second, assimilation occurs and the rainbow images appear to merge. Present single imager DLP™ systems run at less than 1000 color flashes per second so the rainbow effect is seen.

Color flash speed is difficult to increase because micro-mirror physical mass limits the maximum off-on-off flip time which sets the least significant unit of digital grey scale without the use of dithering. With the 8-bit grey scale range used in home television projectors the maximum flash time is 255 times larger. For Smooth Picture™ each color must light each micro-mirror at least twice per 16.6 mS image. The flashes are distributed by increasing the number of color wheel segments to increase the flash rate to 6 or 9 flashes per 8.33 mS or 720 to 1075 flashes per second.

Existing DLP imagers, however, suffer from several problems. The color wheel wastes light, as the light having the colors that are reflected by the color wheel is typically lost. Also, color separation or break-up artifacts degrade the image quality of the projection system, as described above. As such, a system for reducing color separation or breakup artifacts and/or having improved resolution is needed.

SUMMARY

The present invention is directed to a controllable reflecting device having an array of bi-axial mirrors that are capable of pivoting in at least four directions. At least three primary colored light beams are directed, at each of the bi-axial mirror in three of the four pivoting directions, one for each of the primary colored light beams and a single colored beam is reflected and directed toward a projection lens. In the fourth pivoting direction, no color beam is directed to the projection lens and black is projected. The present reflecting device is useful for systems employing light emitting diode (LED) or flood beam laser light sources rather than a color wheel because such systems include multiple light sources that can be located at convenient angles to the reflecting plane.

Each mirror in the array of mirrors is driven so that the color beams are sequentially selected during a video frame time. Each beam is selected for a fractional portion of the frame time proportional to the desired intensity of the color. Super saturation of color is possible because there is no fixed maximum per color time period as imposed by a color wheel filter. With this system it is possible to show up to 100% of any one primary color at the expense of the other colors. To prevent the sequential rainbow effect, the rate of color flashing can be greatly increased to satisfy the luminance sensitivity of the human eye.

BRIEF DESCRIPTION OF THE DRAWINGS

The invention will now be described with reference to the accompanying figures of which:

FIG. 5A-5D shows the four pivot positions for the micro-mirror shown in FIG. 4.

DETAILED DESCRIPTION

The present invention provides a color projection system, such as for a television display, which produces color via a single micro-mirror imager device where color is selected from a plurality of primary color beams that approach the imager from a plurality of angles.

Figure 1:
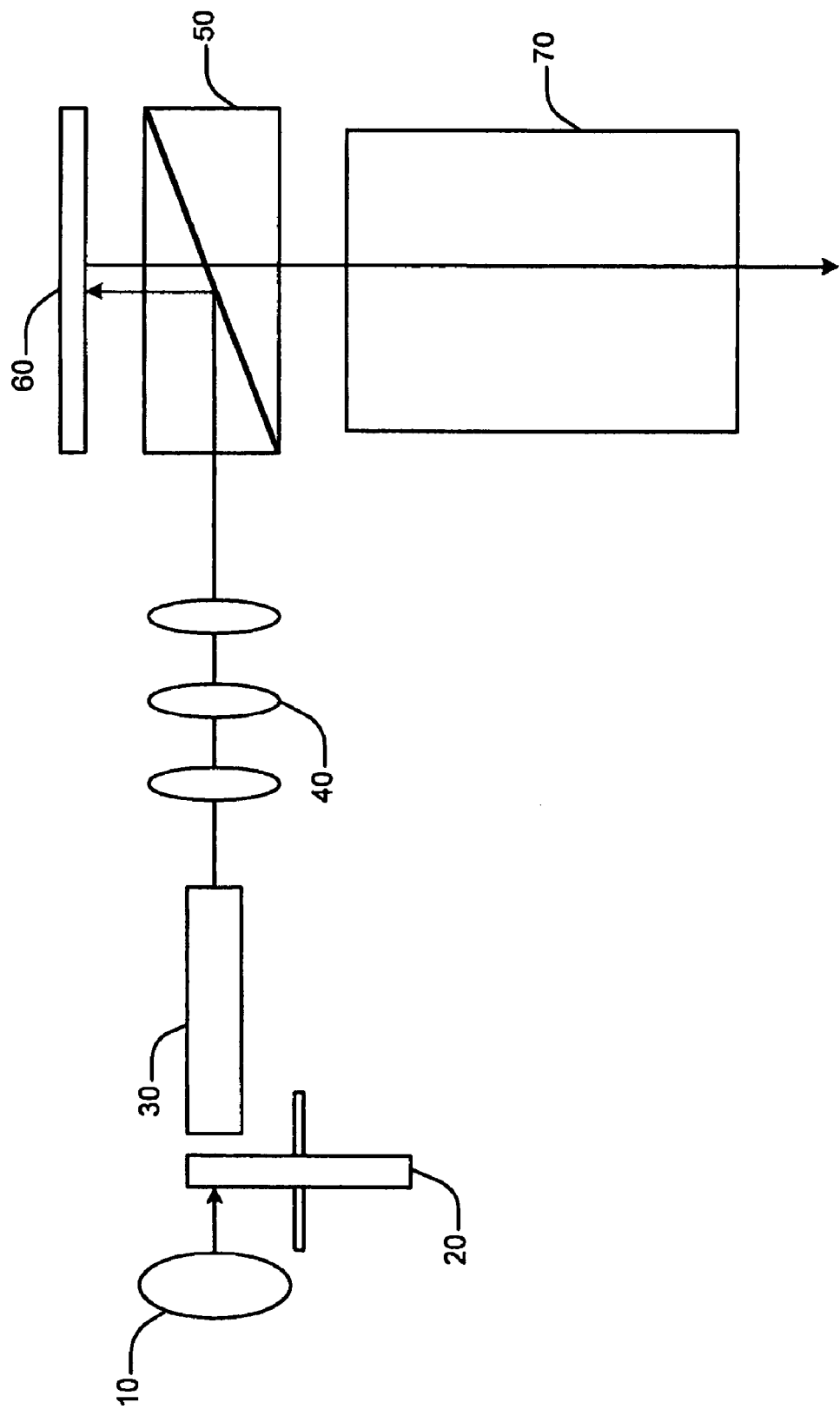
FIG. 1 shows a diagrammatic view of an existing digital light pulse (DLP) projection system.
Figure 2:
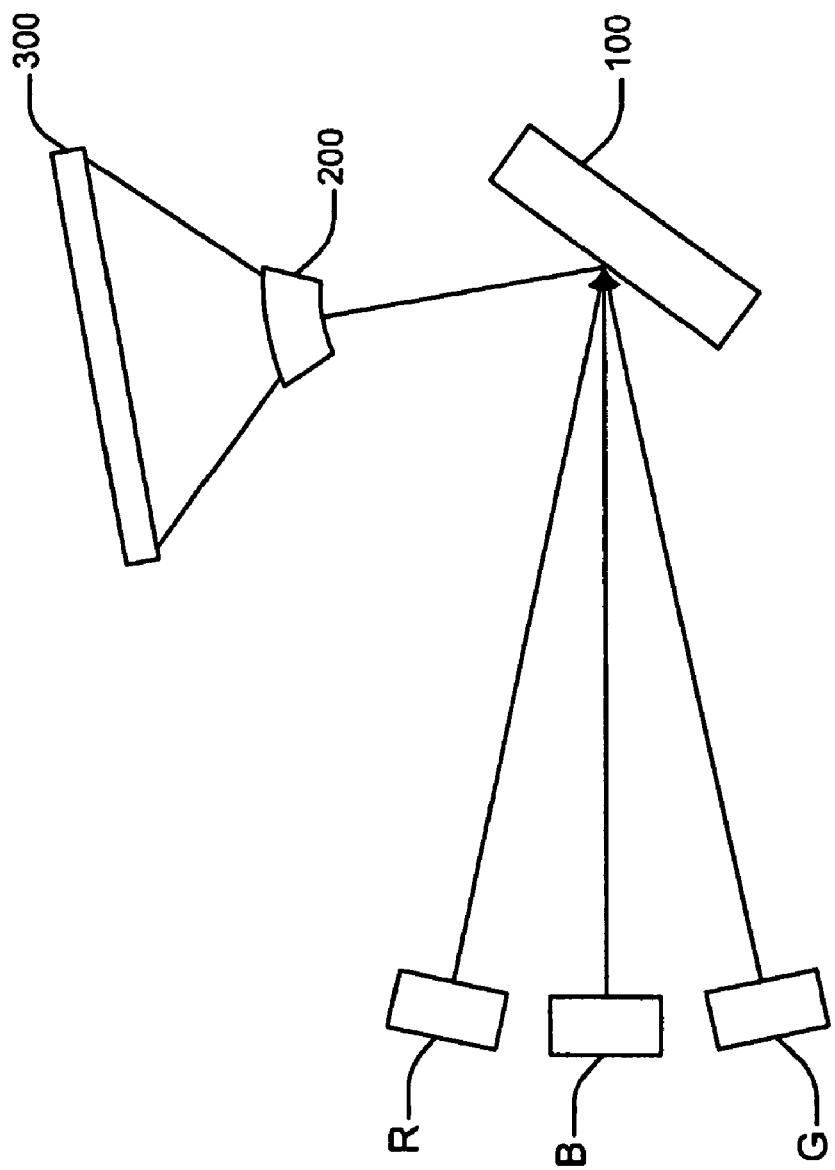
FIG. 2 shows a diagrammatic view of a projection system according to an exemplary embodiment of the invention.
Figure 3A:
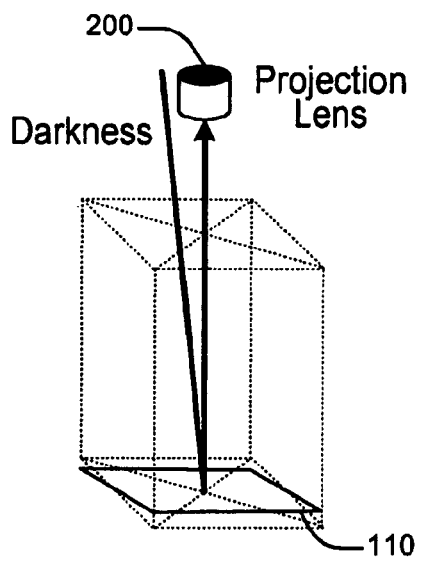
FIG. 3A-3D shows an exemplary bi-axial micro-mirror in four pivoting positions.
Figure 3B:
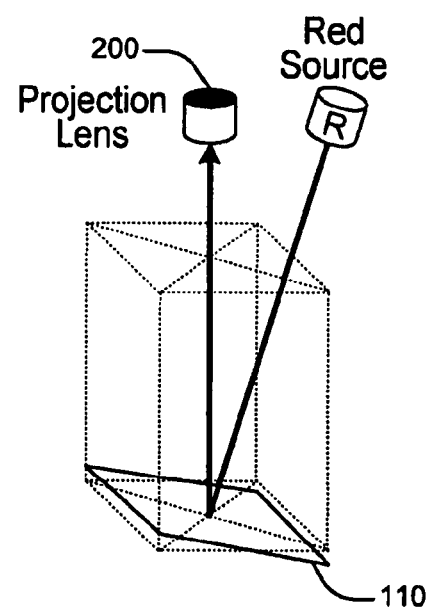
Figure 3C:
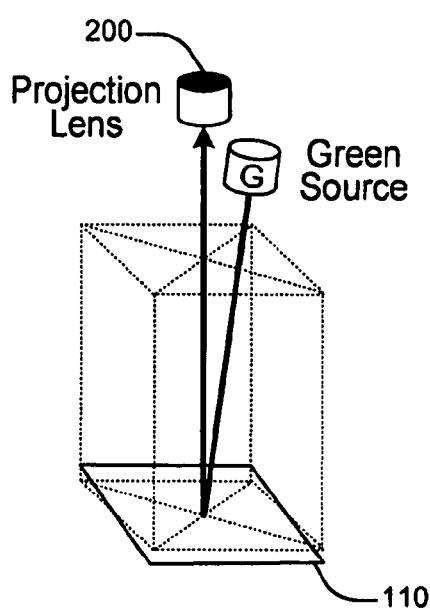
Figure 3D:
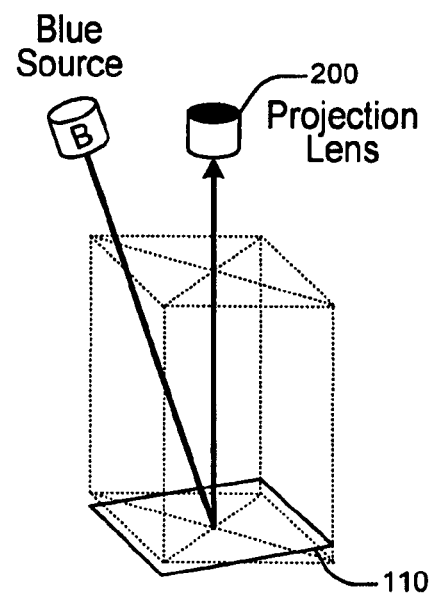

FIG. 2 is a diagrammatic view of a projection system according to an exemplary embodiment of the invention. Three light primary color light sources R, G, B are each positioned to provide red, blue and green light beams to an imager 100. The image from imager 100 is provided via a projection lens 200 to screen 300.

The imager is a Digital Micro-Mirror Device (DMD) including an array of micro-mirrors (not shown). Each micro-mirror of the array is a bi-axial micro-mirror. A bi-axial micro-mirror 110 has a plurality of digital positions, shown in FIGS. 3A-3D, such that light from the color sources R, G, B is output onto projection lens 300. At least one digital position of the mirror reflects darkness. FIGS. 3A-3D, each show an exemplary micro-mirror 110 in various digital positions and the selection of darkness or one of red, green or blue.

Figure 4:
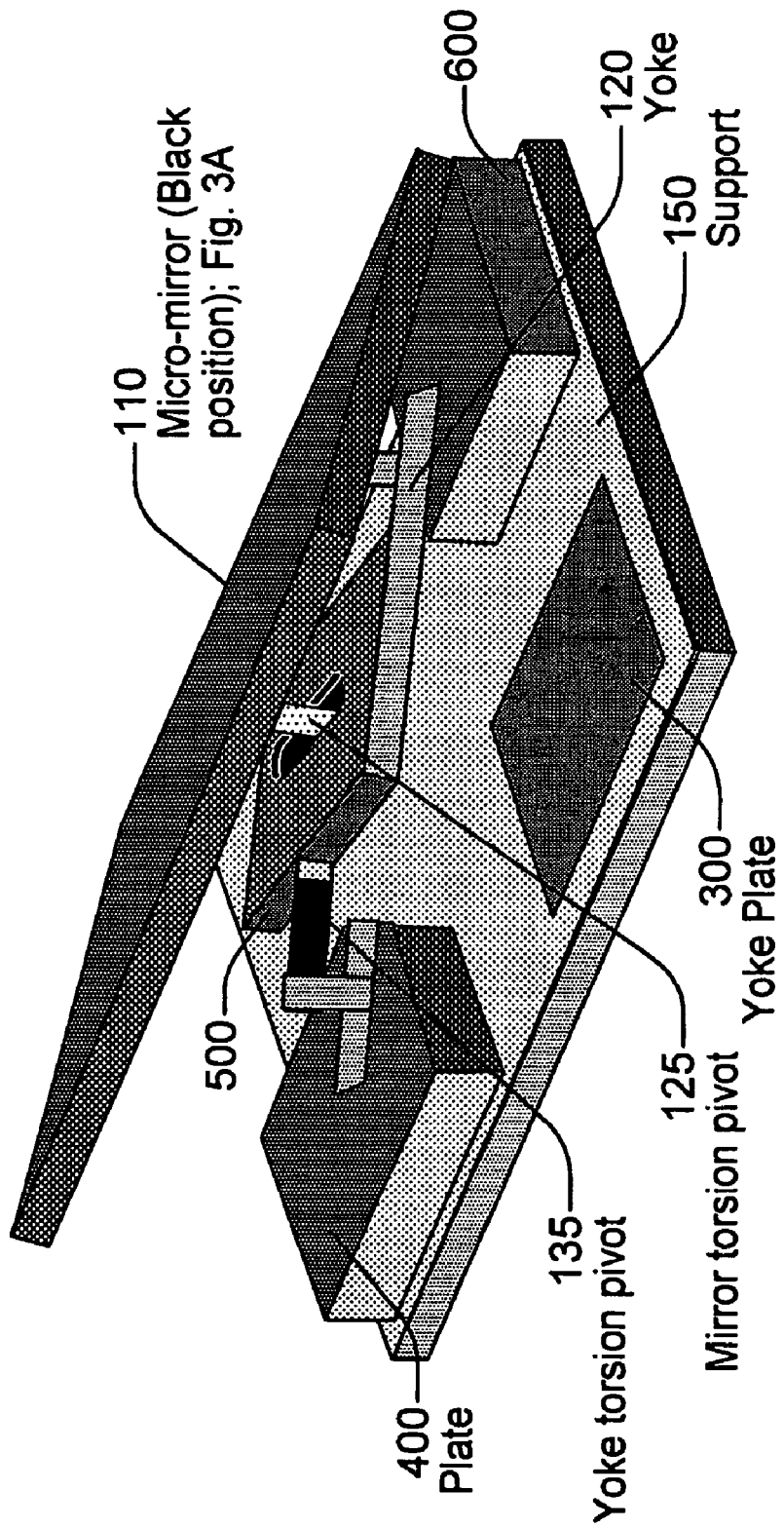
FIG. 4 shows one embodiment of a micro-mirror of the present invention.

An exemplary embodiment of a micro-mirror 110 is shown in FIG. 4. The micro-mirror 110 is coupled by a yoke 120 attached to the array support 150. A mirror torsion pivot 125 couples the micro-mirror 110 to the yoke 120 and a yoke torsion pivot 135 couples the yoke 120 to array support 150. The micro-mirror 110 pivots on the mirror torsion pivot 125 so that the micro-mirror 110 moves at an angle with respect to a line normal to the yoke 120 upper surface. In one example, the micro-mirror can move +/−12 degrees with respect to a line normal to the yoke 120 upper surface. In addition the yoke 120 can move at an angle with respect to a line normal to the support 150 surface by means of the yoke torsion pivot 135. Here again, the yoke 120 can move at +/−12 degrees with respect to a line normal to the support 150 surface.

The mirror pivot 125 and the yoke pivot 135 are perpendicular to each other and in the same plane. This allows the micro-mirror 110 to move on two axes to the four positions illustrated in FIGS. 3A-3D.

Both the mirror pivot 125 and the yoke pivot 135 are electrically conductive torsion bars. The mirror 110 and the yoke 120 are also electrically conductive and connected to a common node on support 150. Four independent electrically conductive plate areas 300, 400, 500, 600 on the support 150 surface underlie the four corners of the micro mirror 110. The plate areas 300, 400, 500, 600 serve as attraction capacitance plates. In one embodiment, the plate areas 300, 400, 500, 600 are operated in pairs. For example, two plates 300, 500 to operate the yoke and two plates 400, 600 to operate the mirror, so that one of the four edges of the mirror 110 is selectively attracted toward the support 150 surface for selecting a color or darkness, as shown in FIGS. 3A-3D.

The beams of the three primary colors red (R), green (G) and blue (B) are directed toward the mirror 110 surface from angles that are twice the mirror deflection angle. Each beam enters from a different direction as shown in FIGS. 3A-3D. In one embodiment, the beams of each of the three primary colors may be directed toward the mirror surface at an angle of about 24 degrees, which is twice the mirror deflection angle of +/−12 degrees.

Referring to FIGS. 5A-5D, when selecting a color or darkness, two of the conductive plate areas 300, 400, 500, 600 are neutral (N) with respect to the common node connected mirror/yoke structure and two of the conductive plate areas 300, 400, 500, 600 are active (+) with respect to the potential of the mirror 110 and the yoke 120. The active (+) plates attract the yoke 120 and the mirror 110. The actual voltages may be either positive or negative with respect to the mirror 110 and the yoke 120. It is the field from the voltage difference that provides the attraction. The ability to develop a large electric field between the conductive plate areas 300, 400, 500, 600 and the mirror 110 and yoke 120 provides for a fast mirror position switching speed.

The charge difference between the mirror and yoke produces a field between them with strength proportional to the voltage between them. This field seeks to minimize the distance between the plates areas. The process of moving the dual axis mirror involves voltage differences between the mirror and pairs of the control plates that are next to one another as shown in FIGS. 5A-5D. Because the 2 axis are diagonal under the square mirror this causes one of the four mirror edges to move as close as possible to the mounting surface. N on a control plate means no voltage difference with respect to the mirror. Voltage pulses to facilitate attraction may be applied to the control plates via drivers integrated in the silicon under the mirrors.

The mirror torsion pivot 125 and the yoke torsion 135 provide a restoring force that returns the mirror 110 to a neutral state parallel to the support 150 surface when there is no drive signal. Torsion pivot restoration is not a significant factor during imager operation.

During an "eye dart", a point on a person's retina can change position at up to 800 degrees/second. If color sampling is not fast enough to provide fusion, i.e., <0.27 degrees/sample, color separation multiple images will be seen colored in the three primary colors. Prevention of this rainbow effect requires that either color flashing must be very fast or that different colors coexist and be evenly distributed so that color fusion can occur spatially. The micro-mirror array described herein can select multiple colors at the pixel level and can vastly increase the color flashing speed compared to a color wheel. The micro-mirror array described herein can also present color on the display sampled spatially.

In one embodiment, using for example, Smooth Picture™ technology diamond shaped pixels, the vertical time frame is divided into two halves, one for each of the smooth picture images. Each half frame time is then divided into one or more sub-frame periods. Each sub-frame period can hold a maximum number of Least Significant Flashes (LSFs). One LSF is the fastest flash within the mechanical capability of the micro-mirror. The brightness produced by mirror flashes is the linear sum of the LSFs. A person's eye requires log-based brightness increases, so the input signal is gamma corrected.

Darker parts of an image require a finer step size. The color selecting micro-mirror can switch colors (i.e., black-color-black or color 1-color 2-color 1) and produce a LSF at a rate similar to the LSF of a single axis micro-mirror (black-light-black). Such an arrangement allows the flashes to be time customized to the color peaks of the light source so as to produce white of a given color temperature. In one embodiment, a given light source may produce the desired white with 61% green, 31% red and 8% blue, so a dark gray may be 8 LSF green+4 LSF red+1 LSF blue. This is a "white packet". The micro-mirror repeats this "white packet" color switching pattern building up a brighter and brighter white. This arrangement produces a maximum color switching speed for black and white images to satisfy the luminance sensitivity of the eye. If the pixel is colored, the white producing sequence ends as the desired intensity for one primary color is reached. The other two primary colors continue in their white pattern ratio until the desired intensity for the second primary is reached. Finally, the third primary continues until the desired intensity is satisfied.

A large number of mirror movements are required for this approach. The present invention addresses this problem because the "white packet" sequence can be slowed down by lengthening each color flash while maintaining the white proportion. To avoid rainbows, the color sampling rate should exceed 3000 samples per second. For example, with LSFs of 5 μS, a minimum "white packet" in the above embodiment is 65 μS, giving 15385 samples per second. Lengthening the color sample in each white packet by a factor of 5 reduces the minimum "white packet" to 3077 color samples per second with one-fifth the number of mirror moves.

For still images, color fusion occurs when adjacent primary color pixels are less than 0.12 degrees separated on the retina. This is the basis for color sub-pixel displays. Rainbow elimination can be achieved spatially if adjacent pixels are not showing the same color at the same time. This arrangement allows slower color flash sampling speeds without eye dart rainbows. For example, if RGB stripes are flashed than stepped one pixel perpendicular to the stripes twice in a frame time, each pixel properly shows all three colors, such that the stripes will not be seen and the colors will fuse.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A projection system, comprising:
   a micro-mirror array, wherein the micro-mirror array includes a plurality of bi-axial mirrors moveable in at least four directions; and
   wherein each bi-axial mirror in the micro-mirror array is driven so that each of the at least four directions are sequentially selected for a fractional portion of a video frame time proportional to a color intensity and light directed onto each bi-axial mirror is reflected toward a projection lens.

2. The projection system of claim 1 wherein a red light source, a blue light source and a green light source generate and direct a red light beam, a green light beam and a blue light beam at each bi-axial mirror of the micro-mirror array in three of the at least four directions, and no light beam is directed at each bi-axial mirror in the at least fourth direction.

3. The projection system of claim 2 wherein the red light beam, the green light beam and the blue light beams are each directed at each bi-axial mirror of the micro-mirror array at twice the mirror deflection angle.

4. The projection system of claim 2 wherein the red light beam, the green light beam and the blue light beam are each directed at a first bi-axial mirror of the micro-mirror array and then directed at two or more bi-axial mirrors adjacent to the first bi-axial mirror twice during the video time frame.

5. A micro-mirror array, comprising:
   a plurality of bi-axial mirrors moveable in at least four directions; and
   a drive circuit coupled to the plurality of bi-axial mirrors, wherein each bi-axial mirror is driven such that each of the at least four directions are sequentially selected for a fractional portion of a video frame time proportional to a color intensity.

6. The micro-mirror array of claim 5 further comprising a red light source, a blue light source and a green light source generate and direct a red light beam, a green light beam and a blue light beam at each bi-axial mirror of the micro-mirror array in three of the at least four directions, and no light beam is directed at each bi-axial mirror in the at least fourth direction.

7. The micro-mirror array of claim 6 wherein the red light beam, the green light beam and the blue light beams are each directed at each bi-axial mirror of the micro-mirror array at twice the mirror deflection angle.

8. The micro-mirror array of claim 5 wherein the red light beam, the green light beam and the blue light beam are each directed at a first bi-axial mirror and then directed at two or more bi-axial mirrors adjacent to the first bi-axial mirror twice during the video time frame.

* * * * *